(12) United States Patent
Eloo (10) Patent No.: US 9,492,948 B2
(45) Date of Patent: *Nov. 15, 2016

(54) METHOD AND APPARATUS FOR MAKING CRYSTALLINE PET PELLETS

(71) Applicant: GALA INDUSTRIES, INC., Eagle Rock, VA (US)

(72) Inventor: Michael Eloo, Xanten (DE)

(73) Assignee: GALA INDUSTRIES, INC., Eagle Rock, VA (US)

(*) Notice: Subject to any disclaimer, the term of this patent is extended or adjusted under 35 U.S.C. 154(b) by 635 days.

This patent is subject to a terminal disclaimer.

(21) Appl. No.: 13/753,292

(22) Filed: Jan. 29, 2013

(65) Prior Publication Data

US 2013/0264739 A1 Oct. 10, 2013

Related U.S. Application Data

(60) Continuation of application No. 12/081,903, filed on Apr. 23, 2008, now Pat. No. 8,366,428, which is a division of application No. 10/954,349, filed on Oct. 1, 2004, now abandoned, which is a continuation-in-part of application No. 10/717,630, filed on Nov. 21, 2003, now Pat. No. 7,157,032.

(51) Int. Cl.
*B29B 9/16* (2006.01)
*B29B 9/06* (2006.01)
*B29B 13/02* (2006.01)
*B29C 31/00* (2006.01)
*B29K 67/00* (2006.01)

(52) U.S. Cl.
CPC ............... *B29B 9/065* (2013.01); *B29B 9/16* (2013.01); *B29B 13/021* (2013.01); *B29C 31/00* (2013.01); *B29B 2009/165* (2013.01); *B29C 2793/0027* (2013.01); *B29K 2067/00* (2013.01); *B29K 2995/0039* (2013.01); *B29K 2995/0041* (2013.01); *Y10S 425/23* (2013.01)

(58) Field of Classification Search
USPC .......................................................... 264/143
See application file for complete search history.

(56) References Cited

U.S. PATENT DOCUMENTS

| | | | | |
|---|---|---|---|---|
| 3,544,525 A | * | 12/1970 | Abos | ............ B29B 9/06 264/142 |
| 3,988,085 A | | 10/1976 | Krchma | |
| 4,223,128 A | | 9/1980 | Halek et al. | |

(Continued)

FOREIGN PATENT DOCUMENTS

| | | |
|---|---|---|
| DE | 10209149 | 9/2003 |
| EP | 0305862 | 3/1989 |

(Continued)

*Primary Examiner* — Jacob Thomas Minskey
(74) *Attorney, Agent, or Firm* — Jacobson Holman, PLLC.

(57) ABSTRACT

A method and apparatus for underwater pelletizing and subsequent drying of polyethylene terephthalate (PET) polymers and other high temperature crystallizing polymeric materials to crystallize the polymer pellets without subsequent heating. High velocity air or other inert gas is injected into the water and pellet slurry line to the dryer near the pelletizer exit. Air is injected into the slurry line at a velocity of at least about 200 m³/hour. Such high-speed air movement forms a vapor mist with the water and significantly increases the speed of the pellets into and out of the dryer such that the PET polymer pellets leave the dryer at a temperature sufficient to self-initiate crystallization within the pellets.

21 Claims, 5 Drawing Sheets

(56) References Cited

U.S. PATENT DOCUMENTS

| | | |
|---|---|---|
| 4,237,622 A | 12/1980 | Francis |
| 4,374,044 A | 2/1983 | Schaefer et al. |
| 4,385,016 A | 5/1983 | Gwinn |
| 4,389,522 A | 6/1983 | Boeke et al. |
| 4,609,721 A | 9/1986 | Kirshenbaum et al. |
| 4,632,752 A | 12/1986 | Hunke |
| 4,850,835 A | 7/1989 | Rudolph |
| 4,963,644 A | 10/1990 | Duh |
| RE33,492 E | 12/1990 | Hunke |
| 5,290,913 A | 3/1994 | McAllister et al. |
| 5,532,335 A | 7/1996 | Kimball et al. |
| 5,573,790 A | 11/1996 | Wehtje et al. |
| 5,607,700 A | 3/1997 | Kando et al. |
| 5,609,892 A | 3/1997 | Garcia et al. |
| 5,633,018 A | 5/1997 | Stouffer et al. |
| 5,830,981 A | 11/1998 | Koreishi et al. |
| 5,895,617 A * | 4/1999 | Mizuguchi ............... B29B 9/06 264/141 |
| 6,110,406 A | 8/2000 | Ishibashi et al. |
| 6,551,643 B2 | 4/2003 | Bernatz et al. |
| 7,291,694 B1 | 11/2007 | Borer et al. |
| 2005/0056961 A1* | 3/2005 | Bonner .................... B29B 9/06 264/143 |
| 2005/0062186 A1 | 3/2005 | Fellinger |
| 2005/0110182 A1 | 5/2005 | Eloo |
| 2005/0154183 A1 | 7/2005 | Ekart et al. |

FOREIGN PATENT DOCUMENTS

| | | |
|---|---|---|
| EP | 0785226 | 7/1997 |
| GB | 1278297 | 6/1972 |
| WO | WO 00/23497 | 4/2000 |
| WO | WO 01/12698 | 2/2001 |
| WO | WO 03/037588 | 5/2003 |
| WO | WO 2004/033174 | 4/2004 |

* cited by examiner

METHOD AND APPARATUS FOR MAKING CRYSTALLINE PET PELLETS

RELATED APPLICATIONS

This application is a continuation application of application Ser. No. 12/081,903, filed Apr. 23, 2008, which will issue as U.S. Pat. No. 8,366,428 on Feb. 5, 2013, which was a divisional application of Ser. No. 10/954,349, filed Oct. 1, 2004, and now abandoned, which was a continuation-in-part application of U.S. application Ser. No. 10/717,630, filed Nov. 21, 2003, now U.S. Pat. No. 7,157,032 issued Jan. 2, 2007, and hereby claims the priority thereof to which it is entitled.

BACKGROUND OF THE INVENTION

1. Field of the Invention

The present invention generally relates to a method and apparatus for underwater pelletizing and subsequent drying of polyethylene terephthalate (PET) polymers. More specifically, the present invention relates to a method and apparatus for underwater pelletizing PET polymers and subsequent drying of the PET polymer pellets in a manner to self-initiate the crystallization process of the PET particles and produce pellets having a desired level of crystalline structure rather than an amorphous structure.

2. Description of the Prior Art

Underwater pelletizing systems for producing pellets of polymeric or other plastic materials has been known for many years. The starting materials such as plastic polymers, coloring agents, additives, fillers and reinforcing agents, and modifiers, are mixed in kneaders. In the process, a melt is produced which is extruded or pressed through dies to form strands which are immediately cut by rotating cutter blades in the water box of the underwater pelletizer. Water with or without additives is continuously flowing through the water box to cool and solidify the polymer strands and pellets and carry the pellets out of the water box through transport piping to a dryer, such as a centrifugal dryer, where the water is removed from the pellets.

For quite some time, the polymer industry has sought to process PET polymers into a pellet shape using underwater pelletizer systems. A major drawback of using underwater pelletizing, as well as other pelletizing systems, for processing PET into pellet shapes is the typically amorphous condition of these pellets when they leave the dryer of the underwater pelletizing system. The amorphous nature of the resulting pellet is caused by the fast cooling of the PET material once introduced into the water flow in the water box of underwater pelletizer and while the water and pellet slurry is being transported by appropriate piping to the dryer.

Typically, increasing the water flow through the water box of the underwater pelletizer and increasing the water temperature, along with pipe dimensional changes and reducing the distance between the pelletizer and dryer unit, does not help to sufficiently maintain the pellet temperature. Under such circumstances, the PET pellets still leave the dryer at a temperature, usually below 100° C., which is below the temperature at which crystallization can occur.

End users of PET polymer pellets typically require that the pellets be in a crystalline state, rather than an amorphous state, principally for two reasons, both relating to the fact that the end user wants to process the PET pellets in a substantially dry condition, with zero or near zero water content. First, PET polymers are very hygroscopic, and crystalline PET pellets absorb considerably less moisture during shipment and storage than amorphous PET pellets. Accordingly, crystalline PET pellets can be dried to the requisite zero or near zero moisture content more easily by the end user. Second, the temperature required to completely dry PET polymers is higher than the temperature at which amorphous PET pellets convert to the crystalline form. Therefore, when drying amorphous PET pellets, it is necessary to first achieve crystallization at the requisite lower temperature before raising the temperature to the drying temperature. Otherwise, the amorphous PET polymer pellets may agglomerate and destroy the pellet form.

As a result, manufacturers of PET pellets must typically subject the amorphous PET pellets to a secondary heating step of several hours at very high temperatures, usually in excess of 80 to 100° C., to change the amorphous structure of the pellets to a crystalline structure. This is a very expensive second step in order to convert the PET polymer pellets into the desired crystalline state.

However, it is recognized by the end users and manufacturers of PET pellets that total (100%) crystallinity of the PET pellets is not necessarily required in order to dry the PET pellets for further processing or use in the Solid State Process (SSP). Rather, a total crystallinity, or crystallinity grade using the Calcium Nitrate measurement method, above 30%, and preferably above 40%, is acceptable for the PET end users.

An alternative approach is disclosed in WO 2004/033174 in which the polymer is granulated or pelletized in a water bath at a temperature of more than 100° C. The resulting pellets may be further treated in the water bath for a defined period of time thereafter, while retaining the high temperature, in order to convert the amorphous material into a crystalline material. This system requires pressurization to maintain the water at the super-boiling point temperature, followed by a pressure reduction procedure.

It is also known generally that air can be injected into the exit stream of a water and pellet slurry from a pelletizer in order to enhance the transport of the water/pellet slurry. See, for example, U.S. Pat. No. 3,988,085.

SUMMARY OF THE INVENTION

The present invention is directed to an underwater pelletizing system that produces PET pellets in a hot enough condition to self-initiate the crystallization process therein and ultimately provide a sufficiently crystalline character such that the PET pellets do not require a separate heating step in order to undergo end user processing. It has been discovered that this elevated heat condition can be accomplished by reducing the residence time of the pellets in the water slurry in order to leave enough heat in the PET pellets during the drying stage so that the crystallization process is initiated from inside the pellets. To do this, it is necessary to separate the pellets from the water as soon as possible and to significantly increase the speed of pellet flow from the exit of the underwater pelletizer and into and through the dryer. The hot pellets leaving the dryer can then be carried on a conventional vibrating conveyor or other vibrating or handling equipment for a time sufficient to achieve the desired crystallinity and avoid agglomeration. The hot pellets can also be stored in a heat retaining condition, such as in a heat insulating container, to complete the desired crystallization process. For example, coated steel or plastic containers should be acceptable, instead of the stainless steel boxes conventionally used.

The early pellet/water separation and increased pellet speed through the pelletizer system is accomplished in accordance with the present invention by injecting air or other suitable gas into the transportation piping leading from the pelletizer to the dryer just after the cut pellets and water slurry exit the water box of the pelletizer unit. It has been found that the injected air serves to separate the water from the pellets in the transportation piping by converting the water to a water vapor mist, significantly speeds up the transport of the pellets to and through the dryer, and can serve to generate a pellet temperature exiting the dryer that is sufficiently high to initiate the crystallization process within the pellets. Specifically, while the PET polymer pellets may come out of the dryer in an amorphous condition, there is still sufficient heat remaining inside the pellets for crystallization to occur. The extent of the crystallization is sufficient to eliminate the necessity of the second heating stage heretofore required to make PET pellets using previous underwater pelletizing systems.

The air introduced into the slurry line leading to the dryer immediately after the exit from the water tank is at a very high velocity. It has been found that an air volume of from at least 100 cubic meters ($m^3$)/hour, to about 175 $m^3$/hour, or more, through a valve at a pressure of 8 bar and into a 1.5 inch slurry pipe line produces the requisite air velocity for the present invention. The volume of air introduced into the exiting water and pellet slurry produces an overall gas/slurry mixture in the nature of a mist and is likely to have a gas component of 98%-99% or more by volume of the overall mixture. The air injection into the slurry line dramatically increases the speed of the pellet flow from the water box to the exit of the dryer to a rate less than one second. While air is the preferred gas in view of its inert nature and ready availability, other inert gases such as nitrogen or similar gases could be used. Other pellet speed expediting methods that would comparably separate the liquid water from the pellets and accelerate the pellets from the pelletizer to the dryer exit might also be employed.

The slurry piping preferably includes a ball valve or other valve mechanism after the air injection point. The ball valve allows the operator to better regulate the residence time of the pellets in the piping and dryer, and serves to significantly reduce or eliminate any vibrations in the slurry pipe to the dryer. The ball valve or valve mechanism also appears to provide an improved water vapor mist condition in the slurry pipe downstream of the valve mechanism.

It has been found that crystalline PET pellets can be formed in accordance with the method and apparatus of the present invention if the residence time of the pellets from the point of formation by the cutter blades at the die face to the exit from the centrifugal dryer is sufficiently reduced by the injection of high velocity air or other gas into the slurry line. While larger pellets lose their heat more slowly so as to retain a high enough temperature upon exit to undergo crystallization at lower injected air velocities, such as 100 $m^3$/hour, as the air velocity increases smaller pellets with a lower exit temperatures also exhibit acceptable levels of crystallization. Hence, the rapid separation of the pellets from the water and the shortened residence time assures that the PET pellets exit the dryer of the underwater pelletizing system while retaining sufficient heat inside the pellets to achieve the desired crystallization in the amorphous pellets, particularly if the pellets are transported from the dryer by a heat-retaining vibrating conveyor for a time sufficient to achieve the desired level of crystallinity, and/or properly stored in a heat insulating container. As a result, the necessity of a secondary heating step is eliminated.

When transported away from the dryer in a vibrating conveyor, it has been found that transport for a time from about 20 seconds to about 90 seconds, or more, is sufficient to achieve the desired crystallinity. The preferred transport time is about 30 second to 60 seconds, and the most preferred is about 40 seconds.

Accordingly, it is an object of the present invention to provide a method and apparatus for processing PET polymers in an underwater pelletizing system which can produce crystallization in the PET pellets that exit from the dryer.

It is another object of the present invention to provide a method and apparatus for producing crystallization in PET polymer pellets utilizing an underwater pelletizing system without the necessity of an expensive secondary heating stage to convert amorphous PET pellets to crystalline PET pellets.

It is a further object of the present invention to provide a method and apparatus for the underwater pelletizing of PET polymer in which an inert gas is injected into the water and pellet slurry exiting the pelletizer to produce a water vapor mist form of slurry handling, thereby providing better heat retention in the transported pellets.

A still further object of the present invention is to provide a method and apparatus for underwater pelletizing of PET polymer in accordance with the preceding object in which the pellets are rapidly transported through the equipment through the injection of air at a velocity of at least 100 $m^3$/hour, to about 175 $m^3$/hour or more, so that the residence time of the pellets before exiting the dryer is sufficiently reduced to generate crystallization on the order of 30%-40% of total (100%) crystallization.

It is yet another object of the present invention to provide a method and apparatus for producing PET polymer pellets using an underwater pelletizing system in which the pellets exiting the dryer have sufficient heat remaining inside the pellets for at least 35% total crystallization of the PET pellets to occur without subsequent heating.

It is still a further object of the present invention to provide an underwater pelletizing method and apparatus for producing PET pellets in which the residence time of the PET pellets from the time of extrusion at the die face until exit from the centrifugal dryer is reduced to less than about one second by gas injection into the slurry line from the pelletizer to the dryer.

A still further object of the present invention is to provide an underwater pelletizing method and apparatus for producing PET pellets in accordance with the preceding object in which the residence time is regulated using a valve mechanism for improved pressurization of the water vapor mist downstream of the valve in the slurry line.

It is another object of the present invention to provide an underwater pelletizing system in which the hot pellets exiting the dryer are carried on a vibrating conveyor or other vibrating or handling equipment to achieve virtually uniform crystallization throughout a given output pellet volume.

These together with other objects and advantages which will become subsequently apparent reside in the details of construction and operation of the invention as more fully hereinafter described and claimed, reference being had to the accompanying drawings forming a part hereof, wherein like numerals refer to like parts throughout.

DETAILED DESCRIPTION OF THE INVENTION

Although only preferred embodiments of the invention are explained in detail, it is to be understood that the invention is not limited in its scope to the details of construction and arrangement of components set forth in the following description or illustrated in the drawings. The invention is capable of other embodiments and of being practiced or carried out in various ways.

Also, in describing the preferred embodiments, terminology will be resorted to for the sake of clarity. It is intended that each term contemplates its broadest meaning as understood by those skilled in the art and includes all technical equivalents which operate in a similar manner to accomplish a similar purpose. For example, the term "water" includes not only water itself, but also water with one or more additives included, which are added to the water during the underwater pelletizing step for various purposes used by those skilled in the art of underwater pelletizing.

Figure 1:
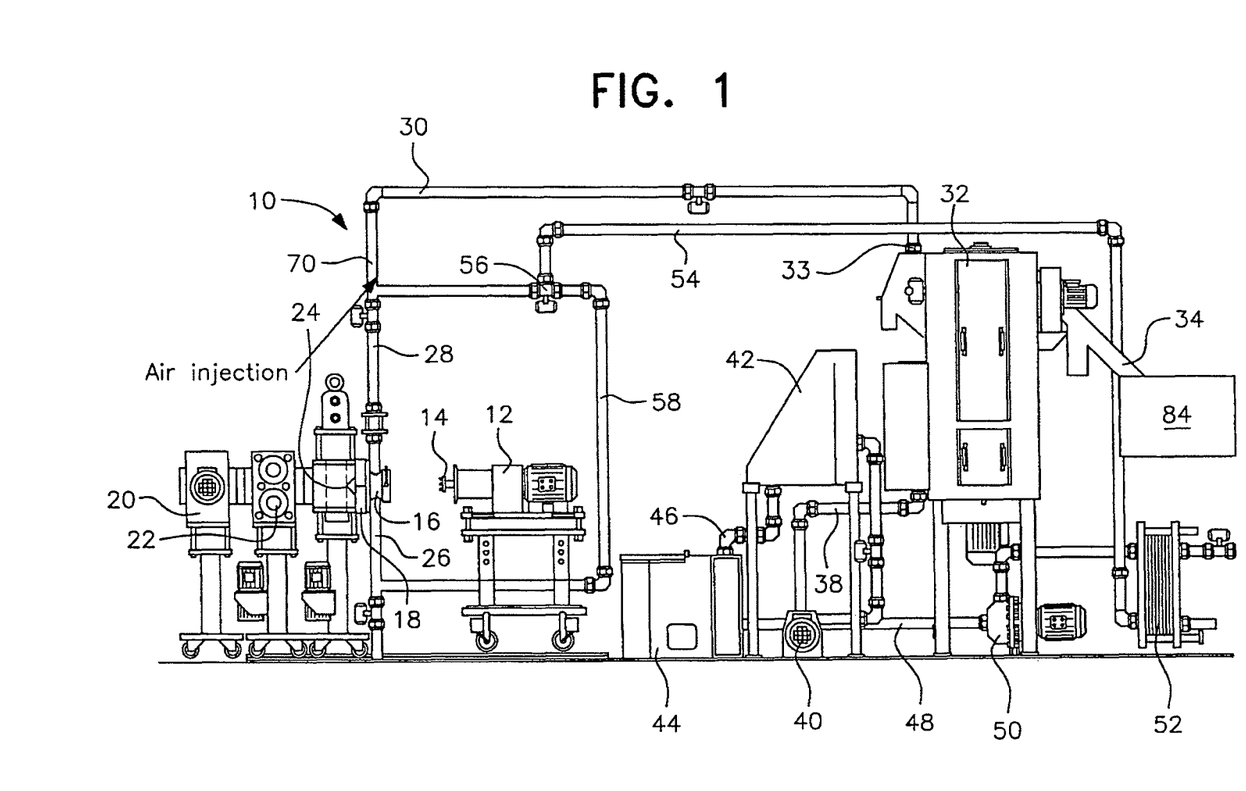
FIG. 1 is a schematic illustration of an underwater pelletizing system, including an underwater pelletizer and centrifugal dryer as manufactured and sold by Gala Industries, Inc. ("Gala") of Eagle Rock, Va., with air injection and vibrating conveyor in accordance with the present invention.

An underwater pelletizing system for use in association with the present invention is schematically shown in FIG. 1 and is generally designated by reference number 10. The system 10 includes an underwater pelletizer 12, such as a Gala underwater pelletizer, with cutter hub and blades 14 shown separated from the water box 16 and die plate 18. In the underwater pelletizing system 10, PET polymer is fed from above from a polymer vat (not shown) into a screen changer 20 which removes any solid particles or other material. The PET polymer is then fed through gear pump 22 to control and maintain a smooth flow of the polymer into the polymer diverter 24 and die plate 18. The PET polymer is typically extruded through holes in the die plate at a temperature of about 260° C. The PET polymer strands formed by the die holes enter into the water box 16 and are cut by the cutter hub and blades 14 into the desired pellets. Cold water flows into the water box 16 through pipe 26 and the water and cut pellet slurry exits through pipe 28.

The water and pellet slurry is then conveyed through the slurry line 30 into a dryer 32, such as a Gala centrifugal dryer, at inlet 33. The pellets are dried in the dryer 32 and exit the dryer at 34. The water removed from the dried pellets exits the dryer 32 through pipe 38 and is conveyed by pump 40 into a fines removal sieve 42 and thence into a water tank 44 through pipe 46. The recycled water leaves water tank 44 through pipe 48 and pump 50 into a water heat exchanger 52 to reduce the water temperature. The cooled water is recycled through pipe 54 past bypass valve 56 and pipe 58 to inlet pipe 26 and then into the water box 16.

In accordance with the present invention, air is injected into the underwater pelletizing system in slurry line 30 at point 70, preferably near the beginning of the slurry line 30 adjacent the exit from the water box 16, in order to enhance the transport of PET pellets in the slurry line 30 and keep the PET pellets at a high enough temperature to foster the desired crystallization.

The air is conveniently injected into the slurry line 30 at point 70 using a conventional compressed air line typically available in most manufacturing facilities, such as with a pneumatic compressor, and a standard ball valve sufficient to produce a high velocity air flow in the slurry line 30. This is readily achieved by a volume of air of at least 100 m$^3$/hour through a standard ball valve at a pressure of 8 bar into a slurry line comprising a standard 1.5 inch pipe. This high velocity air (or other gas) when contacting the water and hot pellets generates a water vapor mist. The pellets tend to disperse to the inside circumference of the pipe as they move rapidly therethrough to the dryer. It is estimated that the volume of air in the overall gas/slurry mixture is on the order of 98%-99% or more by volume of the overall mixture. The air injected into the slurry line 30 at point 70 increases the speed of the pellet flow from the water box 16 to the exit 34 of the dryer 32 to a rate of less than one second.

The mean temperature of the PET polymer pellets exiting the dryer 32 at 34 in accordance with the present invention should be above about 145° C. at an air velocity of 100 m$^3$/hour, but may be lower when the air velocity is increased to 175 m$^3$/hour. With such high velocity pellet speed expediting action, the PET pellets retain sufficient heat inside the pellets to initiate crystallization therein, without the necessity of a secondary heating step.

Figure 2A:
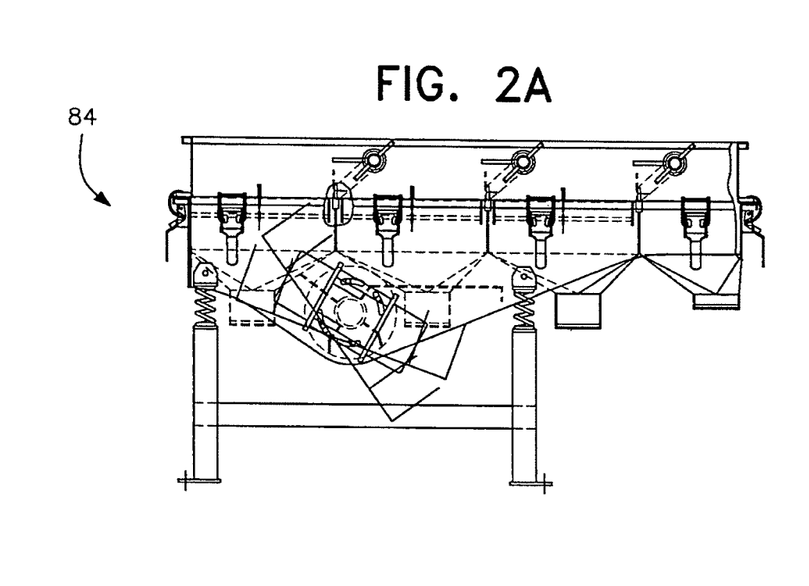
FIGS. 2A and 2B are schematic illustrations of side and end views, respectively, of the vibrating conveyor of FIG. 1.
Figure 2B:
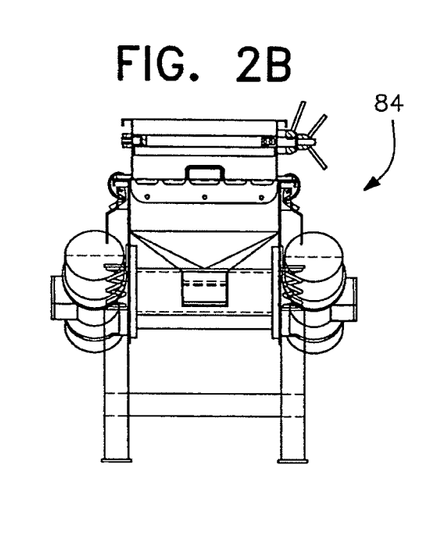

Pellets exiting the dryer are preferably directed through a vibration unit, such as vibrating conveyor 84, as shown in FIGS. 2A and 2B. Through agitation and mixing of the crystallizing pellets in the vibration conveyor 84, variations in the temperatures of pellets which might otherwise occur through proximity of individual pellets to a containment wall versus immersion amongst other pellets, for instance, are avoided. Instead, uniformity in temperature and in the resulting degree of crystallization is greatly improved. In addition, stickiness resulting from the elevated pellet temperatures is countered through the jostling and relative movement of the pellets which prevents any clumping or adherence of the pellets to the surrounding wall structure.

For crystallization purposes, it is has been found that the pellets should remain in the vibration conveyor between about 20 and about 90 seconds, or more, preferably between about 30 and about 60 seconds, and most preferably about 40 seconds. During this time, sufficient heat is retained by the vibration conveyor to maintain the pellets at a high enough temperature to complete the desired crystallization. Larger pellets having an exit temperature on the order of 145° due to their greater mass may require only 10 seconds at that temperature within which to achieve 40% crystallization. With their smaller mass and relatively greater surface area, smaller pellets having a cooler exit temperature of about 127° C. may require 20 seconds at that temperature to complete the desired crystallization. The remaining time in the vibrating conveyor allows the pellets to cool to a greater or lesser extent.

If additional cooling is required due, for example, to the operator's inability to store, use or transport heated pellets from the exit of the vibration conveyor, then air blowers may be added at such exit or the vibration conveyor may be designed to provide a residence time of up to approximately two minutes. Generally, the temperature of the pellets is about 128° C. at the entrance to the vibration conveyor, and between 60° C. and 110° C. at the exit thereof, depending upon whether or not the operator has provided for additional pneumatic cooling directly on the conveyor in order to output pellets that are fully cooled for handling purposes (60° C.) or instead requires only that the pellets be crystalline (110° C.) upon leaving the vibrating conveyor. The preferred exit temperature for most purposes is less than 80° C., while a higher surface tack temperature (<100° C.) is sufficient for some grades of PET polymer.

If a vibrating unit is not used, or in addition to the vibrating unit, the PET polymer pellets exiting the dryer 32 can be placed in appropriate heat insulating containers so that the retained heat in the PET pellets is sufficient to complete the desired crystallization process, before the pellets cool below the crystallization temperature.

Figure 3:
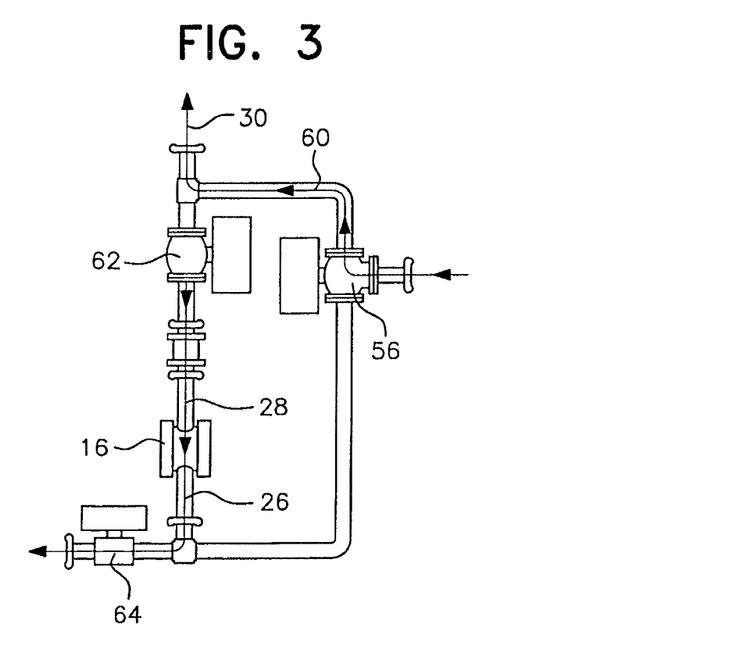
FIG. 3 illustrates certain components of the underwater pelletizing system shown in FIG. 1 during a bypass mode when the process line has been shut down.

In by-pass mode shown in FIG. 3, the recycled water goes through bypass 56 into pipe 60 and then into slurry line 30. In the bypass mode, the valve 62 is closed and the water/pellet slurry in line 30 and water box 16, along with the water in inlet line 26 can drain from the system out of drain valve 64.

Figure 4:
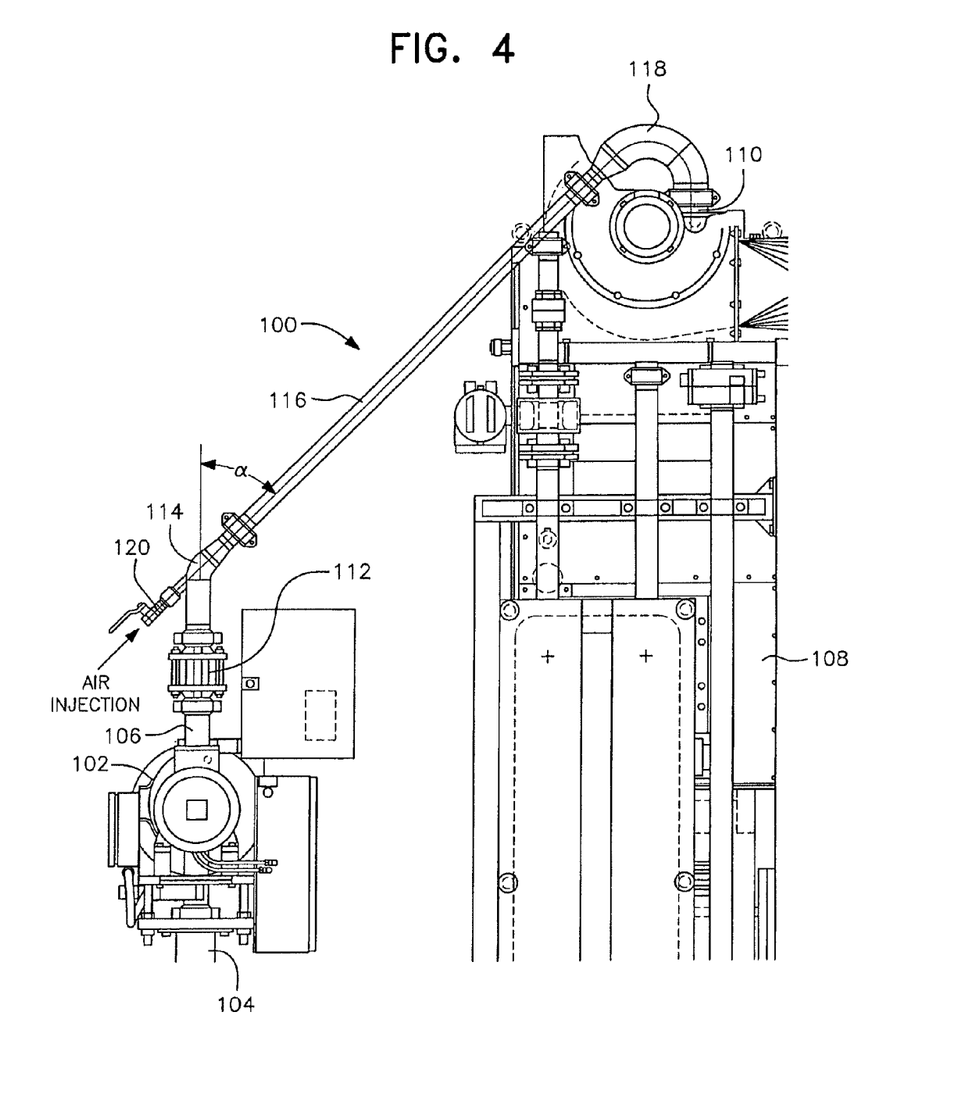
FIG. 4 is a schematic illustration showing a preferred method and apparatus for air (or gas) injection into the slurry line from the pelletizer to the dryer in accordance with the present invention.

FIG. 4 schematically illustrates one preferred arrangement for air injection into the slurry line of an underwater pelletizing system in accordance with the present invention and is generally designated by reference numeral 100. The underwater pelletizer 102 illustrated is a Gala Model No. A5 PAC 6, with water inlet pipe 104 and slurry exit line 106. The dryer 108 illustrated is a Gala Model No. 12.2 ECLN BF, with the slurry entrance 110 at the top. Inasmuch as the exit from the underwater pelletizer 102 into slurry line 106 is significantly below the entrance 110 to the centrifugal dryer 108, when both are level on a manufacturing floor, it is necessary to transport the water and pellet slurry upwardly from the pelletizer exit to the dryer entrance. The water and pellet slurry thus moves through valve 112 past angled elbow 114, through angled slurry line 116, past enlarged elbow 118 and then into the entrance 110 of dryer 108. The air injection is past nozzle or valve 120 and directly into the angled elbow 114.

As shown in FIG. 4, the angled slurry line 116 is preferably straight and has an enlarged elbow 118 at its exit end. The enlarged elbow facilitates the transition of the high velocity water and pellet slurry from the straight slurry line 116 into the dryer entrance 110 and reduces potential agglomeration into the dryer 108. Further, the air injection into the angled elbow 114 is preferably in line with the axis of slurry line 116 to maximize the effect of the air injection on the water and pellet slurry and to keep constant aspiration of the air/slurry mixture.

While the angle between the vertical axis of slurry line 116 and the longitudinal axis of angle slurry line 116 is most preferably about 45°, as shown in FIG. 4, a preferred range is 30°-60°. Moreover, the angle can be varied from 0° to 90°, and even more in the event the water and pellet slurry exit from pelletizer 102 is higher than the entrance 110 to dryer 108 when, for example, the pelletizer and dryer are placed at different levels in the plant or the heights of the components are different than shown in FIG. 4.

Figure 5:
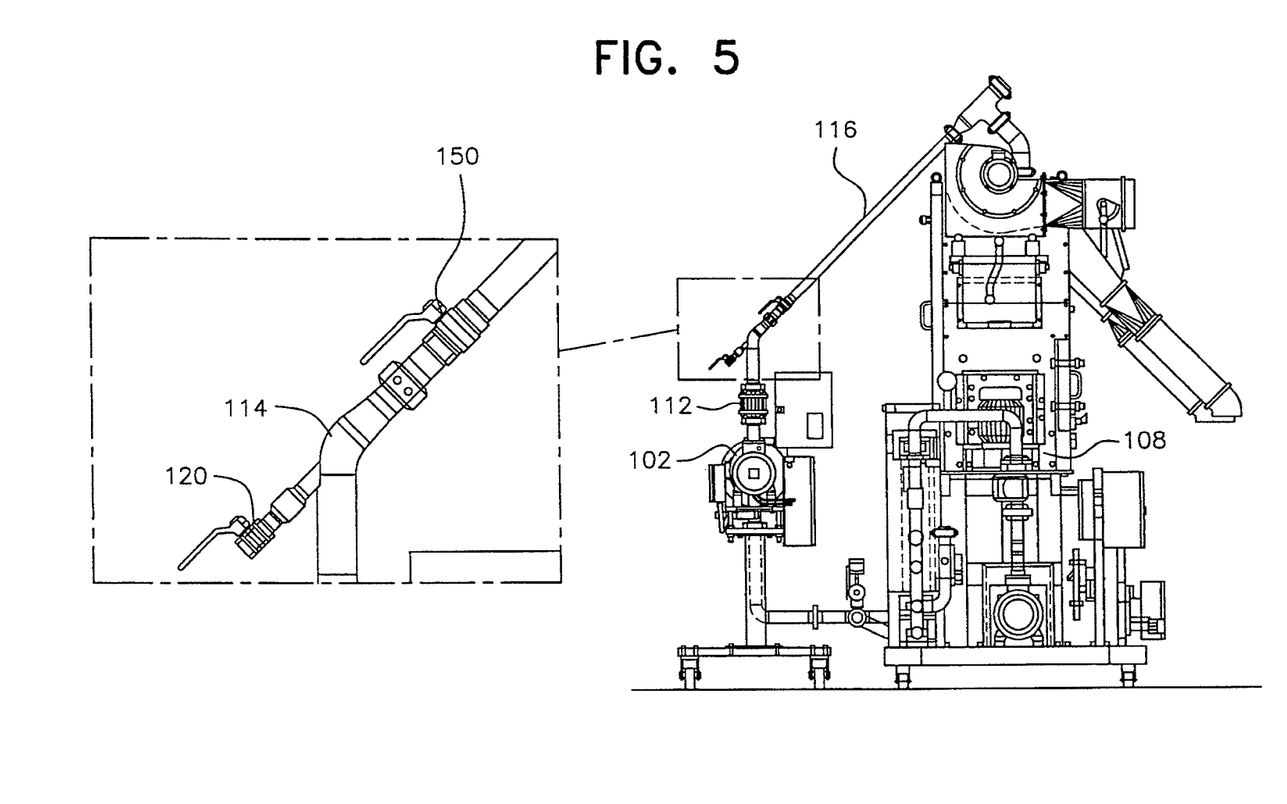
FIG. 5 is a schematic illustration showing a preferred method and apparatus for air (or gas) injection into the slurry line from the pelletizer to the dryer with a ball valve in the slurry line, in accordance with the present invention.

With the air injection as described, the residence time of the pellets from the water box to the exit is less than one second which has been found to produce pellets with the desired crystallization. However, in another preferred embodiment, a second ball valve or valve mechanism 150 is positioned after the air injection point, as shown in FIG. 5. The valve mechanism 150 serves to better regulate the residence time of the pellets within the slurry line while retaining sufficient head pressure on the cutting chamber. This second valve mechanism not only provides for regulating the residence time of the pellets in the slurry line but also reduces vibration in the slurry pipe significantly. In addition, the resulting pressurization of the air injected chamber seems to improve the water vapor mist generated in the slurry pipe downstream, enhancing the results obtained with smaller pellets in particular.

TRIAL EXAMPLES

First Trial Set

Molten PET polymer was continuously extruded into an overall underwater pelletizing system as illustrated in FIG. 1, using a Gala Underwater Pelletizer Model No. A5 PAC 6 and a Gala Model 12.2 ECLN BF Centrifugal Dryer, in the arrangement shown in FIG. 3. The melt temperature was about 265° C. and the cutter blade speed in pelletizer 102 was varied between 2500 and 4500 RPM. The die plate was typical for PET polymers and a typical 3.5 mm die plate with elongated lands was used. The melt velocity through the die holes during the trials was constant at 40 kg/hole/hr.

The pipe for slurry line 116 was a standard 1.5 inch pipe and its length was 4.5 meters. The speed of centrifugal dryer 108 was kept constant during the trials, and the countercurrent air flow through the dryer 108 was also kept constant during the trials. A vibrating unit was not used.

The air injection flow rate to nozzle or valve 120 was varied from 0 to a maximum of 100 m$^3$/hour, as indicated in Table 1 below, and the water flow and pellet size also varied, again as indicated in Table 1 below.

The parameters and results of the first set of trials are set forth in Table 1 below.

TABLE 1

| Trial | Pellet size (mm) | Weight of a pellet (g) | Water - temp (° C.) | Water rate (m$^3$/h) | Air injection rate (m$^3$/h) | Pellet temp (° C.) | Crystallinity grade (%) |
|---|---|---|---|---|---|---|---|
| 1 | 5.5 × 3.0 | 0.032 | 76 | 13 | 100 | 155 | 98 |
| 2 | 4.5 × 3.0 | 0.0299 | 74 | 13 | 100 | 152 | 98 |
| 3 | 4.5 × 3.0 | 0.0306 | 71 | 19 | 0 | 105 | 0 |
| 4 | 4.0 × 2.6 | 0.0185 | 64 | 19 | 100 | 130 | 60 |
| 5 | 3.5 × 3.0 | 0.0256 | 69 | 18 | 100 | 136 | 80 |
| 6 | 4.1 × 3.1 | 0.0267 | 73 | 18 | 100 | 146 | 98 |

The pellet temperature and percentage crystallinity as set forth in the last two columns of Table 1 were determined by examining the product coming out of the dryer 108 at the end of each trial. Specifically, when the pellets were visually inspected it was determined approximately how many of 100 pellets had undergone a color change indicating transformation to a more crystalline state. For example, in trial 5, about 80 out of 100 pellets indicated a color change. Temperature of the pellets was also determined on a surface basis using an infrared temperature gauge. The extent to which the pellets may have been "totally" crystallized, with "total" crystallization indicating a state in which each pellet is fully crystalline throughout its individual structure, could not be determined using these external measuring techniques. However, for practical application the pellets were found to be sufficiently crystallized for the purposes of PET end users, effectively demonstrating at least 30-40% crystallization during subsequent testing, with no need for any additional heating/crystallizing processing.

At an air injection velocity of 100 m$^3$/hour, it is preferred that 135° C. be the minimum temperature for PET polymer pellets to leave the dryer, when the pellets have the sizes used in the above tests. However, adequate crystallization at lower exit temperatures may be obtained with this invention if smaller size PET pellets are made, provided the air injection velocity is increased.

Second Trial Set

Molten PET polymer was continuously extruded into an overall underwater pelletizing system as illustrated in FIG. 1, using a Gala Underwater Pelletizer Model No. A5 PAC 6 and a Gala Model 12.2 ECLN BF Centrifugal Dryer, in the arrangement shown in FIG. 3. The melt temperature was about 265° C. and the cutter blade speed in pelletizer 102 was varied between 2500 and 4500 RPM. The die plates used were typical for PET polymers. In order to be able to work with different pellet sizes, die hole diameters and die hole velocities were varied as well as cutter speeds.

The pipe for slurry line 116 was a standard 1.5 inch pipe and its length was 4.5 meters. The speed of centrifugal dryer 108 was kept constant during the trials, and the countercurrent air flow through the dryer 108 was also kept constant during the trials. A vibrating conveyor 84 was used to receive the pellets exiting the dryer.

The air injection flow rate to nozzle or valve 120 was varied from 0 to a maximum of 175 m³/hour, as indicated in Table 2 below, and the water flow and pellet size also varied, again as indicated in Table 2 below.

The parameters and results of the second set of trials are set forth in Table 2 below.

which the first trial set was conducted, however, it was determined that total crystallinity, or crystallinity grade, can be measured using the Calcium Nitrate measurement method. The right-most column shows the results of such an evaluation.

With the air injection method according to the present invention, PET pellets of various sizes can be produced with an acceptable crystallinity grade. This is even possible with pellet weights as low as 0.008 g/pellet provided the air is injected at a high enough velocity. By contrast, using prior art operating devices for pelletizing technology including those using extremely short pipe runs and very high water flows, only a certain percentage, approximately 10-12%, of crystalline pellets can be produced. These so-produced pellets, however, contain significant variation in crystallinity from about 6.9% to up to 35.6%. This limited degree of homogeneity within the pellets is not acceptable. Furthermore, if the pellet size is reduced to 0.012 g/pellet or below, only by the air injection method of the present invention was it possible to produce a yield in which 100% of the pellets were crystallized at least to a 35% grade of crystallinity. PET with a crystallinity percentage of greater than 35% has been found to be crystalline enough for the Solid State Process (SSP) and therefore is acceptable for the PET end users.

TABLE 2

| Sample | Pellet size (mm) | Weight of a pellet (g) | Water - temp (° C.) | Water rate (m³/h) | Air injection rate (m³/h) | Pellet temp (° C.) | Amount of A-C pellets [%] A = amorphous C = crystalline | Crystallinity grade (%) |
|---|---|---|---|---|---|---|---|---|
| 10 | 3.5 × 2.6 | 0.015 | 77 | 20 | 175 | 147 | 100% C | 43.1 |
| 11 | 2.5 × 3.5 | 0.015 | 78 | 22 | 0 | 107 | 10% C | 6.9-30.9 |
| 11 | 3.5 × 2.5 | 0.015 | 78 | 22 | 0 | 107 | 90% A | 3.5 |
| 12 | 2.7 × 2.7 | 0.015 | 78 | 17 | 175 | 129 | 100% C | 43.9 |
| 13 | 2.4 × 3.0 | 0.015 | 78 | 24 | 0 | 109 | 12% C | 10.8-35.6 |
| 13 | 2.4 × 3.0 | 0.015 | 78 | 24 | 0 | 109 | 88% A | 3.7 |
| 14 | 2.6 × 3.1 | 0.012 | 78 | 22 | 175 | 128 | 100% C | 44.1 |
| 15 | 2.6 × 3.1 | 0.012 | 78 | 25 | 0 | 95 | 100% A | 3.3 |
| 16 | 2.0 × 2.7 | 0.011 | 72 | 20 | 175 | 123 | 100% C | 38.9 |
| 17 | 2.4 × 2.4 | 0.010 | 75 | 25 | 175 | 117 | 100% C | 43.0 |
| 18 | 2.2 × 2.2 | 0.008 | 79 | 24 | 175 | 116 | 98% C | 38.9 |

Samples 10 and 11 were run under the same conditions except that Sample 10 was conducted with air injection at a rate of 175 m³/hour and Sample 11 was conducted without any air injection. Similarly, Samples 12 and 13, and Samples 14 and 15, were conducted on the same conditions with respect to each pair, with the exception of the air injection. Samples 16, 17 and 18 had no corresponding tests in the absence of air because the pellet size was too small for effective processing without air injection.

From the results in the second trial set, it can clearly be seen that the air injection method is essential to maintain a crystalline pellet, specifically when trying to achieve pellet weights below 0.015 g/pellet which, in the majority of cases, is the customer target. As compared to the first trial set which, when summarized in copending application, Ser. No. 10/717,630 incorporated herein concluded that a minimum exit temperature was required, the results of the second trial set have clarified the significance of the air injection velocity to achieving the desired crystallinity.

The pellet temperature and percentage crystallinity as set forth in the second and third to right-most columns of Table 2 were determined by visual examination and using an infrared temperature gauge, both as described above in connection with the first trial set. Subsequent to the time at As summarized above, the first and second trial sets were conducted with air flow velocities of 100 m³/hour and 175 m³/hour, respectively. Higher air velocities on the order of 200 m³/hour or higher can also be used, as required by water flow and pellet rate changes.

While the present invention is particularly applicable to the underwater pelletization of PET polymers, it is believed that other polymers which crystallize at elevated temperatures and which retain heat when subjected to high temperatures may also be appropriate for the present invention. Such polymers include certain grades of thermoplastic polyurethane (TPU), PET copolymers and/or PET blends.

The foregoing is considered as illustrative only of the principles of the invention. Since numerous modifications and changes will readily occur to those skilled in the art, it is not desired to limit the invention to the exact construction and operation shown and described. Accordingly, all suitable modifications and equivalents may be resorted to, falling within the scope of the invention.

What is claimed is:

1. A method for processing PET polymers into pellets using an underwater pelletizer, which comprises:
   extruding strands of PET polymer through a die plate in said underwater pelletizer;

cutting the PET polymer strands on an exit side of said die plate into pellets in a cutting chamber of said pelletizer;

transporting said PET pellets out of said pelletizer to a dryer using a water stream;

separating the pellets from the water stream using a water/solids separating device to dry the pellets, said pellets exiting said separating device at an elevated pellet temperature; and passing the pellets at an elevated pellet temperature into and through a vibrating unit while said pellets retain sufficient internal heat to initiate crystallization of said pellets, said vibrating unit improving uniformity in the temperature and the degree of crystallization of said pellets and said pellets exiting said vibrating unit at a temperature above about 60° C.

2. The method as claimed in claim 1 wherein said PET pellets exit said vibrating unit at a temperature of less than 80° C.

3. The method as claimed in claim 1 wherein said PET pellets exit said dryer at a temperature above about 125° C.

4. The method as claimed in claim 1 wherein a mean temperature of the pellets exiting the water/solids separating device is above about 145° C.

5. The method as claimed in claim 1 wherein the temperature of the pellets exiting the vibrating unit is between about 60° C. and about 110° C.

6. The method as claimed in claim 1 wherein the elevated temperature of the pellets entering the vibrating unit is about 128° C.

7. The method as claimed in claim 1 wherein said vibrating unit counters stickiness that results from the elevated pellet temperature to avoid clumping or adherence of the pellets to a surrounding wall structure.

8. The method as set forth in claim 1 wherein the pellets are removed from the vibrating unit at a pellet surface temperature of less than 100° C.

9. The method as set forth in claim 1 wherein the pellets are removed from the vibrating unit at a pellet surface temperature of less than 80° C.

10. The method as set forth in claim 1 wherein the vibrating unit is a vibrating conveyor.

11. A method for thermally processing polyester pellets in order to achieve partial crystallization, comprising:

feeding polyester melt to an underwater pelletizer;

pelletizing the polyester melt in the underwater pelletizer to obtain pellets;

conveying the pellets in process water from the underwater pelletizer to a water/solids separating device to dry the pellets;

feeding the dried pellets at a pellet surface temperature of greater than 100° C. to an agitation device, said agitation device carrying the pellets from the dryer to an exit of the agitation device while the pellets crystallize in said agitation device using retained heat present in the pellets; and removing said pellets from the agitation device at a pellet surface temperature of above about 60° C.

12. The method as claimed in claim 11 wherein the process water is at a temperature of less than 80° C.

13. The method as claimed in claim 11 wherein said method is effective in achieving a desired crystallinity with pellets having a weight of as little as 0.0008 g/pellet.

14. The method as claimed in claim 11 wherein a mean temperature of the pellets exiting the water/solids separating device is above about 145° C.

15. The method as claimed in claim 11 wherein the temperature of the pellets exiting the agitation device is between about 60° C. and about 110° C.

16. The method as claimed in claim 11 wherein the step of feeding the dried pellets to said agitation device includes feeding said pellets at a pellet surface temperature of about 128° C.

17. The method as claimed in claim 11 wherein said agitation device improves temperature uniformity of the pellets while also countering stickiness that results from the elevated pellet temperature to avoid clumping or adherence of the pellets to a surrounding wall structure.

18. The method as claimed in claim 11 wherein said agitation device improves uniformity in the degree of crystallization of said pellets.

19. The method as set forth in claim 11 wherein the pellets are removed from the agitation device at a pellet surface temperature of less than 100° C.

20. The method as set forth in claim 11 wherein the pellets are removed from the agitation device at a pellet surface temperature of less than 80° C.

21. The method as set forth in claim 11 wherein the agitation device is a vibrating conveyor.

* * * * *